(No Model.) 2 Sheets—Sheet 1.

B. HAUSHEER & J. MEYENBERG.
RESINING MACHINE.

No. 297,600. Patented Apr. 29, 1884.

Witnesses:

Inventors:

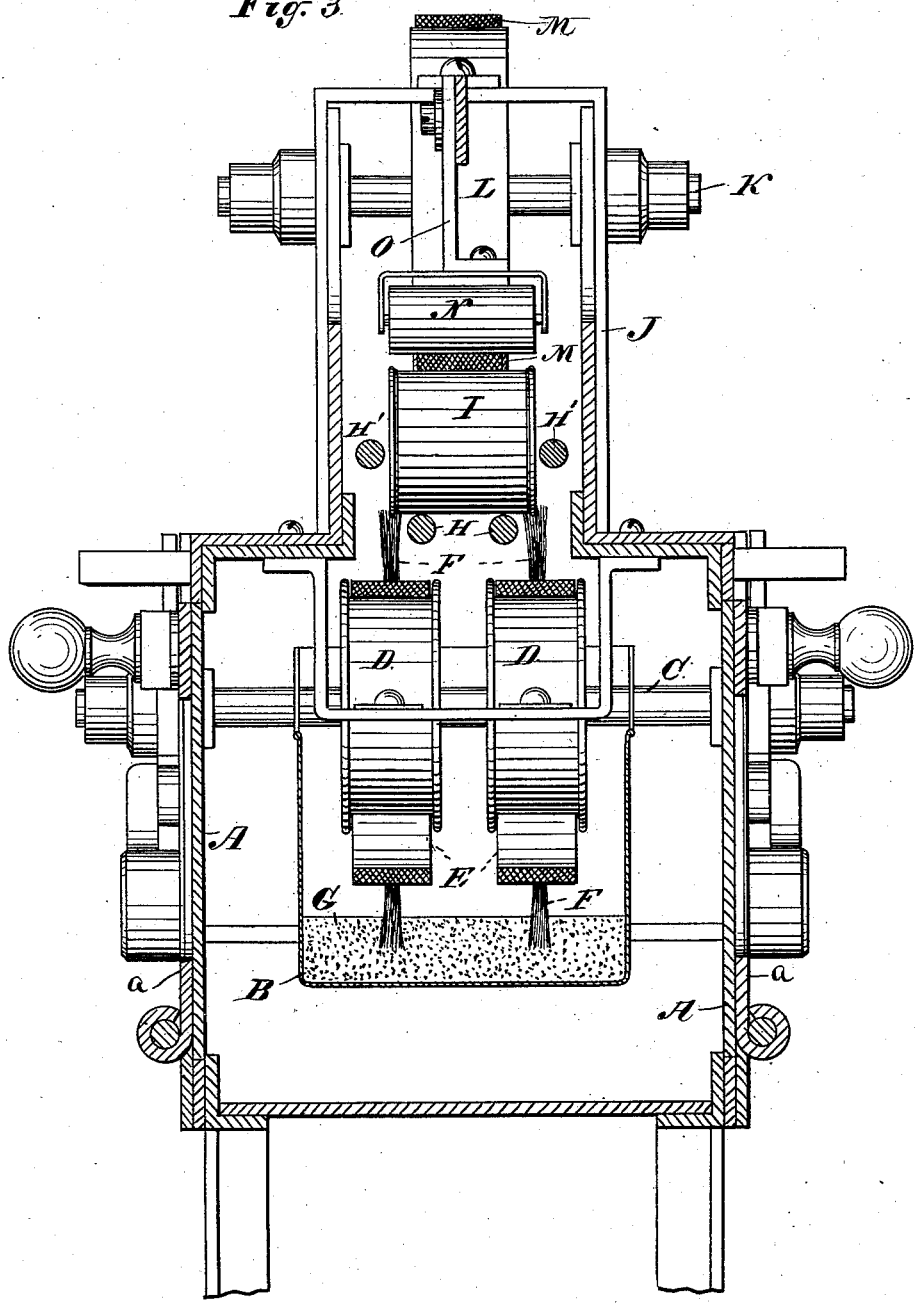

UNITED STATES PATENT OFFICE.

BERNHARD HAUSHEER AND JOHAN MEYENBERG, OF CHAM, SWITZERLAND, ASSIGNORS TO DAVID S. PAGE, OF NEW YORK, N. Y.

RESINING-MACHINE.

SPECIFICATION forming part of Letters Patent No. 297,600, dated April 29, 1884.

Application filed March 15, 1884. (No model.) Patented in Germany February 19, 1881, No. 16,225.

*To all whom it may concern:*

Be it known that we, BERNHARD HAUSHEER and JOHAN MEYENBERG, of Cham, in the Republic of Switzerland, both citizens of Switzerland, have invented certain new and useful Improvements in Resining-Machines; and we hereby declare that the following is such a full, clear, and exact description thereof as will enable others skilled in the art to which they belong to make and use the same.

In the manufacture of articles from tin, particularly cans for hermetically sealing various foods, one step in the process consists of applying a flux, usually resin, to the seams of the cans preparatory to the cans being submitted to the soldering-machine.

It is to mechanism for automatically effecting the application of the flux to such cans that our invention relates; and it consists in a track or guide upon which the cans are supported and moved, above which is mounted an endless band arranged to bear upon the cans and keep them in place upon and in motion along the track, and beneath which is arranged a resin-reservoir provided with an endless band strap arranged to cover the seams to be soldered with resin as the cans are moved above it.

Figure 1:
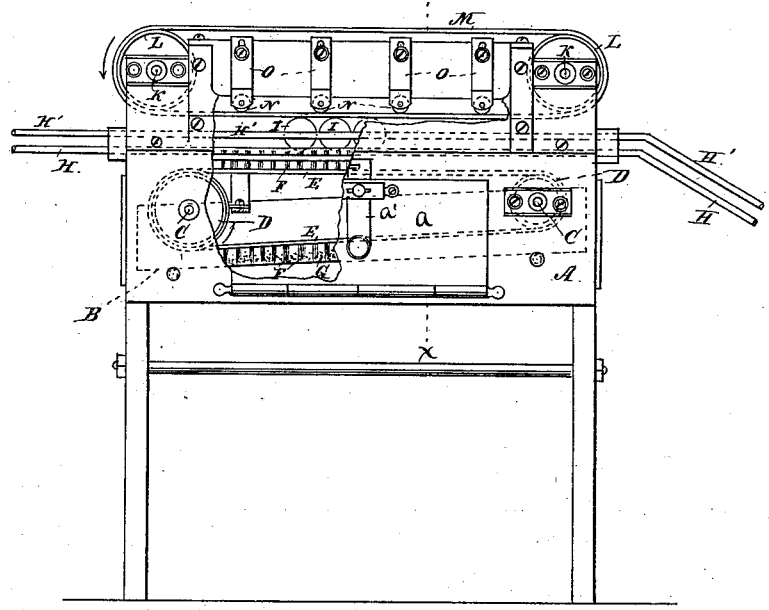
Figure 2:
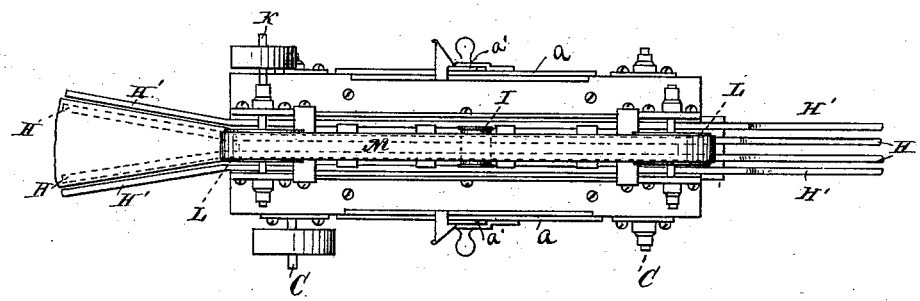

In the drawings accompanying this description, Figure 1 is a side or elevation view of a machine embodying our invention. Fig. 2 is a plan or top view, and Fig. 3 is an enlarged cross-section on the plane $x\ x$ of Fig. 1.

In these views, A represents the box-like body of the machine, which is provided with suitable doors, $a\ a$, having latches $a'$, for gaining access to the interior, and contains the resin trough or reservoir B, which is fastened to the walls thereof.

C C are shafts located just over and near the ends of the resin-trough, upon which are pulleys D D, adapted to carry the endless belts E, which are provided with bristles or brushes F. These shafts and their pulleys are so arranged that the brushes of the lower halves of the endless belts shall come in contact with the resin G in the resin-trough.

Just above the upper halves of the belts E, and running parallel therewith, is a track, H H', composed in this case of four rods arranged relatively as shown in Fig. 3, two of them, H H, being in the same plane and constituting the track proper, and the other two, H' H', being each located a little above and on the opposite sides of this track to serve as guides for the cans I or other articles. This track and the brushes in the endless belt E are so positioned that as the cans travel along the track the brushes F will come in contact with the flanges or other seams of the cans.

From the body of the machine rises the frame J, which is provided with bearings for the shafts K of the pulleys L. These pulleys carry the endless shipping-belt M, and are so located that the lower half of this belt bears upon the cans I and propels them through the machine. At intervals along the lower course of this shipping-belt are rollers N, supported on hangers O, attached to the frame J. These rollers are to keep the shipping-belt in contact with the cans and the cans down upon the tracks, in order that the brush-belt may operate upon them. The shipping-belt and the brush-belts are driven in opposite directions by suitable connection with the same power, so that as the cans are laid upon the track at one end of the machine they are successively caught by the shipping-belt and caused to roll through the machine in such manner that the flanges to be soldered are brought in contact with the resin-filled brushes of the brush-belts, and thereby prepared to receive the solder. As the cans leave the resining-machine the track H conducts them to the soldering-machine P, which is described in another application of even date herewith, No. 124,339.

By the use of this machine a vast increase in the amount of work is gained over the old hand methods, and all the dangers to the health of the workmen, heretofore an influential objection, are entirely removed.

What we claim as new, and desire to secure by Letters Patent, is—

1. In a resining-machine, the combination of a track arranged to support and guide the articles to be resined, a reservoir for containing the resin, and an endless brush-band for applying the resin to the said articles, substantially as shown, and for the purpose specified.

2. The combination, in a resining-machine, of a track arranged to support and guide the articles to be resined, an endless band for moving such articles along said track, a reservoir for holding the resin, and an endless brush-band for applying the resin to said articles, substantially as shown, and for the purpose described.

BERNHARD HAUSHEER.
JOHAN MEŸENBERG.

Witnesses:
HEINRICH WISSLOHN,
GOTTLIEB KOST.